Figure 1:
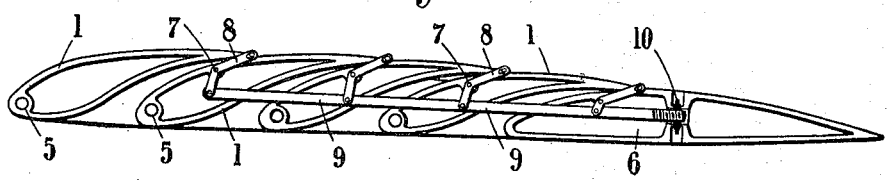

June 3, 1924.

F. H. PAGE

WING FOR AIRCRAFT

Original Filed May 14, 1921

1,496,732

Frederick Handley Page
INVENTOR

By [signature]
Atty

Patented June 3, 1924.

1,496,732

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

WING FOR AIRCRAFT.

Original application filed May 14, 1921, Serial No. 469,402. Divided and this application filed August 14, 1922. Serial No. 581,823.

*To all whom it may concern:*

Be it known that I, FREDERICK HANDLEY PAGE, a subject of the King of Great Britain, residing at London, England, have invented certain new and useful Improvements in Wings for Aircraft, of which the following is a specification.

In the specification of United States Patent No. 1,353,666, dated 21st September 1920, an invention has been described in which a slot or slots is or are formed in the leading portion of a wing extending in a direction transverse to the direction of flight, in order to admit of the passage of air from the under side to the upper side, so as to prevent the burbling effect which takes place with wings when inclined to the air at a large angle of incidence, and by prevention of that burbling permitting the wings to be flown at still greater angles, and greatly improved lift coefficient being thereby obtained.

In a wing having slots of this kind, the wing has been considered as composed of a main wing and one or more auxiliary wings set in front of the leading edge thereof, and it has been stated in the specification that the auxiliary wings are set at a less angle of incidence than the main wings. Thus if there is a difference in angle of 30° between the chord of the main wing and the chord of the auxiliary wing, and the main wing happens to be at an angle of incidence of plus 10°, then the angle of incidence of the auxiliary wing would be minus 20°.

In the specification of my patent application Serial No. 469,402 filed May 14th 1921, of which this is a divisional application, I have described a wing structure for aircraft, comprised by a plurality of wing sections each of wing form extending transversely to the longitudinal axis of the machine, one wing section being located rearward of the other from the leading edge to the trailing edge of said wing structure; a plurality of curved rails were provided extending transversely of such wing sections, and one of said wing sections was to be fixed to the rails, while the other wing sections were slidably connected to said curved rails, and means were provided for sliding said movable sections upon said curved rails relatively to said fixed wing section and to each other to cause said wing sections to be brought into contact with each other or to be separated from each other to form comparatively narrow through slots between said wing sections, and at the same time when said wing sections were so separated, to cause said wing structure to be of greater chord than when said wing sections were in contact with each other and said slots closed.

Now according to the present invention a wing structure for aircraft is wholly composed of a plurality of wing sections each of wing form all extending transversely to the direction of flight, one located rearward of the other from the leading edge to the trailing edge of the wing structure, one such wing section being mounted so as to be stationary relatively to the other wing sections, all of which latter are mounted on pivots at their leading edges, and means are provided coacting between said pivotally mounted wing sections and said stationary wing section to enable said pivotally mounted wing sections to be rocked on their pivots to wholly or partially open or close the slots between the sections, all said wing sections being so mounted to constitute a wing structure and being contained within a contour line of wing form surrounding said wing structure, with which contour line portions of the surfaces of each wing section contact, all said wing sections combining to make up the contour of a whole wing structure. Generally the rearwardly located wing section is mounted to be stationary while all the wing sections forward of such rearward section, are pivoted as aforesaid.

The narrow openings or slots formed between the sections when the wing sections are separated from each other, by being turned about their pivots, extend in directions transversely of the line of flight, the opening of each slot on the under side of each structure being located in advance of the opening in the same slot upon the upper side of the wing structure.

It will be observed that in this specification the term "wing section" is to be understood as a wing of comparatively high aspect ratio having leading and trailing edges, while the term "wing structure" is to be understood as a structure comprising a plurality of such wing sections arranged in tandem from the leading edge to the trailing edge of the wing structure, and all the said wing sections, whether separated to produce the aforesaid slots or brought together to close the same, combine to make up the contour of a whole wing structure.

The invention will be further described with reference to the accompanying drawings.

Figs. 1 and and 2 show a wing structure composed wholly of a plurality of wing sections which are pivotally mounted excepting the rearmost section, which is stationary or fixed, and means are shown for adjusting the pivotally mounted wing sections to open or close the slots between them; Fig. 1 shows the wing sections closed together, and Fig. 2 is a similar view showing the wing sections separated.

Figure 2:
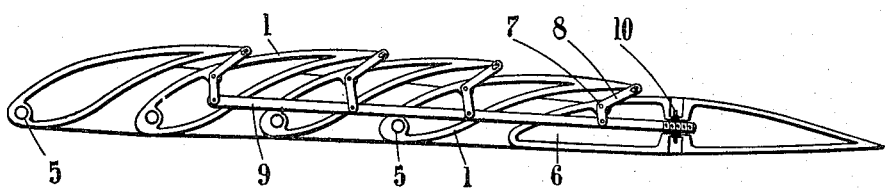

The wing structure shown in the drawings is comprised by a plurality of wing sections 1, each of wing form, all extending transversely of the direction of flight, and while the rearmost wing section is fixed, all the other wing sections are pivotally carried in the wing structure, said wing sections 1 being each mounted upon a pivot 5 at its leading edge, while as aforesaid the rear wing section 6 is fixed stationary in the framework of the wing structure, so that, by means hereafter described, when the wing sections 1 are moved about their pivots from the position shown at Fig. 1 to that shown at Fig. 2, narrow through slots extending in a direction transversely of the line of flight are provided by such movement of said wing sections 1 relatively to the stationary wing section 6 and to each other, the opening of each slot on the under side of said wing being located in advance of the opening of the same slot on the upper side of said wing structure. In either position, as at Fig. 1 or as at Fig. 2, all the said wing sections 1 are contained within a contour line of wing form surrounding said wing structure, with which contour line portions of the surfaces of each wing section contact, all said wing sections combining to make up the contour of a whole wing section.

Means are provided for adjusting the wing sections from the position shown in Fig. 1 to that shown at Fig. 2, and to this end each pivoted wing section 1 rearward of the leading wing section has pivoted to it at 7, a two-armed lever 8, the upper arm of which is pivotally connected to the trailing edge of the next forward wing section, while the lower arm of the lever 8 is pivoted to a connecting rod 9 which enters the stationary wing section 6, where it is screwthreaded and engages a nut wheel 10, which nut wheel is capable of being revolved and prevented having motion in the direction of its axis. The nut wheel 10 may be formed as a spocket wheel as shown, and can be operated by any suitable flexible connection within reach of the aviator.

By operating the nut wheel 10 the pivoted wing sections 1 can be adjusted about their pivots 5 relatively to the stationary rear wing section 6 and to each other, from the position at Fig. 1 where they are closed together to the position at Fig. 2 where they are separated to produce the slots before mentioned.

What I claim as my invention and desire to secure by Letters Patent is:—

1. A wing structure for aircraft, comprised by a plurality of wing sections each of wing form, all extending transversely of the direction of flight, one located rearward of the other from the leading edge to the trailing edge of said wing structure, means for mounting and connecting said wing sections to constitute said wing structure to retain one of said wing sections stationary in said wing structure, and pivots to carry the other movable wing sections so as to be adjustable about said pivots relatively to said stationary wing section and to each other, and means coacting between said pivotally mounted wing sections and said stationary wing section to rock said pivotally mounted wing sections in a predetermined ratio increasing in amount toward the leading element of the wing, to form equal narrow through slots extending transversely of the direction of flight, or to close said wing sections together, all said wing sections whether closed together or separated defining the contour line of wing form surrounding said wing structure, with which contour line portions of the surfaces of each wing section contact, all combining to make up the contour of a whole wing structure.

2. In a wing for aircraft comprising a plurality of elements each of wing form positioned to define the contour of the wing and to be separated by transverse through passages, one of said elements fixedly mounted, the others pivotally mounted, means operable from the fixed element to rock the pivoted elements in a ratio increasing with their distance respectively from the fixed element, whereby the contour of the wing may be varied and the size of the passages controlled, said passages between the various elements being maintained equal at all times and the variation in the contour of the wing bearing a constant ratio to the variation in the size of the passages.

3. A wing structure for aircraft, comprised by a plurality of wing sections each of wing form, all extending transversely of the direction of flight, one located rearward of the other from the leading edge to the trailing edge of said wing structure, means for mounting and connecting said wing sections to constitute said wing structure to retain the most rearward of said wing sections stationary in said wing structure, and pivots to carry the other movable wing sections so as to be adjustable about said pivots relatively to said rearward stationary wing section and to each other, a pivot on each wing section rearward of the leading wing section, a two-armed lever mounted on each of said pivots, and pivots connecting the upper arm of each of said levers to the trailing edge of the next forward wing section, a connecting rod, and pivots connecting the lower arm of each two-armed lever to said connecting rod, the rear end of said connecting rod entering the stationary wing section, a screwthread on the rearward end of said connecting rod, a nut wheel engaging said screwthread on the end of said connecting rod, means to prevent said nut wheel having motion in the direction of the axis of said connecting rod, and means for revolving said nut wheel to cause said pivotally mounted wing sections to be rocked on their pivots to distance one from the other to form narrow through slots extending transversely of the direction of flight and having the opening of each slot on the under side of such wing structure located in advance of the opening of the same slot on the other side of said wing structure, or to close said wing sections together, all said wing sections whether closed together or separated being contained within a contour line of wing form surrounding said wing structure, with which contour line portions of the surfaces of each wing section contact, all combining to make up the contour of a whole wing section.

4. In a wing for aircraft comprising a plurality of elements each of wing form positioned to define the contour of the wing and to be separated by through passages, one of said elements being fixedly mounted and the other elements pivotally mounted, a lever pivotally mounted to each pivoted element and also to the element next adjacent and means for rocking said levers.

In witness whereof I have hereunto set my hand in the presence of two witnesses.

FREDERICK HANDLEY PAGE.

Witnesses:
THOMAS WILLIAM ROGERS,
LESLIE FRANK ROGERS.